United States Patent
Saigusa et al.

(10) Patent No.: US 10,069,670 B2
(45) Date of Patent: Sep. 4, 2018

(54) TRANSMISSION AND RECEPTION CIRCUIT, TRANSCEIVER, AND METHOD OF CORRECTING TIME DIFFERENCE OF SIGNAL

(71) Applicant: KABUSHIKI KAISHA TOSHIBA, Tokyo (JP)

(72) Inventors: Shigehito Saigusa, Kanagawa (JP); Yousuke Hagiwara, Kanagawa (JP); Toshiyuki Yamagishi, Tokyo (JP); Hiroshi Yoshida, Kanagawa (JP); Ichiro Seto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/445,986

(22) Filed: Mar. 1, 2017

(65) Prior Publication Data

US 2018/0083823 A1 Mar. 22, 2018

(30) Foreign Application Priority Data

Sep. 21, 2016 (JP) .................................. 2016-184560

(51) Int. Cl.
*H04L 27/36* (2006.01)
*H04L 7/00* (2006.01)
(Continued)

(52) U.S. Cl.
CPC .......... *H04L 27/364* (2013.01); *H04L 7/0008* (2013.01); *H04L 27/3863* (2013.01); *H04L 27/2089* (2013.01); *H04L 27/2646* (2013.01)

(58) Field of Classification Search
CPC ............. H04L 27/2089; H04L 27/2646; H04L 27/364
See application file for complete search history.

(56) References Cited

U.S. PATENT DOCUMENTS

| 9,231,839 B1 * | 1/2016 | Chen ..................... H04L 27/364 |
| 2008/0030264 A1 * | 2/2008 | Takano ............... H04L 27/3863 329/304 |

(Continued)

FOREIGN PATENT DOCUMENTS

JP          5361927 B2     12/2013

*Primary Examiner* — Ross E Varndell
(74) *Attorney, Agent, or Firm* — Patterson & Sheridan, LLP

(57) ABSTRACT

A transmission and reception circuit includes a transmission circuit, a reception circuit, and a signal feedback path. The transmission path includes an output section, a signal generating circuit generating an in-phase component signal and an orthogonal component signal, and a transmission analog baseband circuit configured to perform digital to analog conversion of the generated in-phase component signal and orthogonal component signal. The reception circuit includes an input section, a reception analog baseband circuit performing analog to digital conversion of the transmitted in-phase component signal and orthogonal component signal, and a signal detection circuit that detects the analog-to-digital converted in-phase component signal and orthogonal component signal converted by the reception analog baseband circuit. The signal feedback path has a first end which is connected to the output section of the transmission circuit, and a second end which is connected to the input section of the reception circuit.

18 Claims, 10 Drawing Sheets

(51) Int. Cl.
*H04L 27/38* (2006.01)
*H04L 27/20* (2006.01)
*H04L 27/26* (2006.01)

(56) References Cited

U.S. PATENT DOCUMENTS

| | | | | |
|---|---|---|---|---|
| 2010/0329311 | A1* | 12/2010 | Hannan | H04B 1/70718 375/149 |
| 2012/0236975 | A1* | 9/2012 | Yamagishi | H03G 3/3068 375/346 |
| 2016/0006632 | A1* | 1/2016 | Chen | H04L 27/2089 375/224 |

* cited by examiner

US 10,069,670 B2

TRANSMISSION AND RECEPTION CIRCUIT, TRANSCEIVER, AND METHOD OF CORRECTING TIME DIFFERENCE OF SIGNAL

CROSS-REFERENCE TO RELATED APPLICATION

This application is based upon and claims the benefit of priority from Japanese Patent Application No. 2016-184560, filed Sep. 21, 2016, the entire contents of which are incorporated herein by reference.

FIELD

Embodiments described herein relate to a transmission and reception circuit, a transceiver, and a method of correcting a time difference of a signal.

BACKGROUND

In the related art, in wireless local area network (LAN) communication, quadrature amplitude modulation (QAM) is used as a technique for transmitting more information by combining phase modulation and amplitude modulation. In QAM, symbols having the number of bits according to a phase modulation scheme are assigned to two types of signals having their phase shifted by 90°, such as an in-phase component signal (hereinafter, referred to as an I signal) and an orthogonal component single (hereinafter, referred to as a Q signal) as a combination of phase and amplitude. Information is transmitted by the number of the bit of the allocated symbols.

In addition, in the related art, in wireless LAN communication, an amplitude error and a phase error between the I signal and the Q signal are detected for ensuring the reception accuracy, and correction of the detected amplitude error and the phase error is performed.

However, in the related art, there is no effective proposal of a technique for correcting the time difference between the I signal and the Q signal.

DETAILED DESCRIPTION

Figure 1:
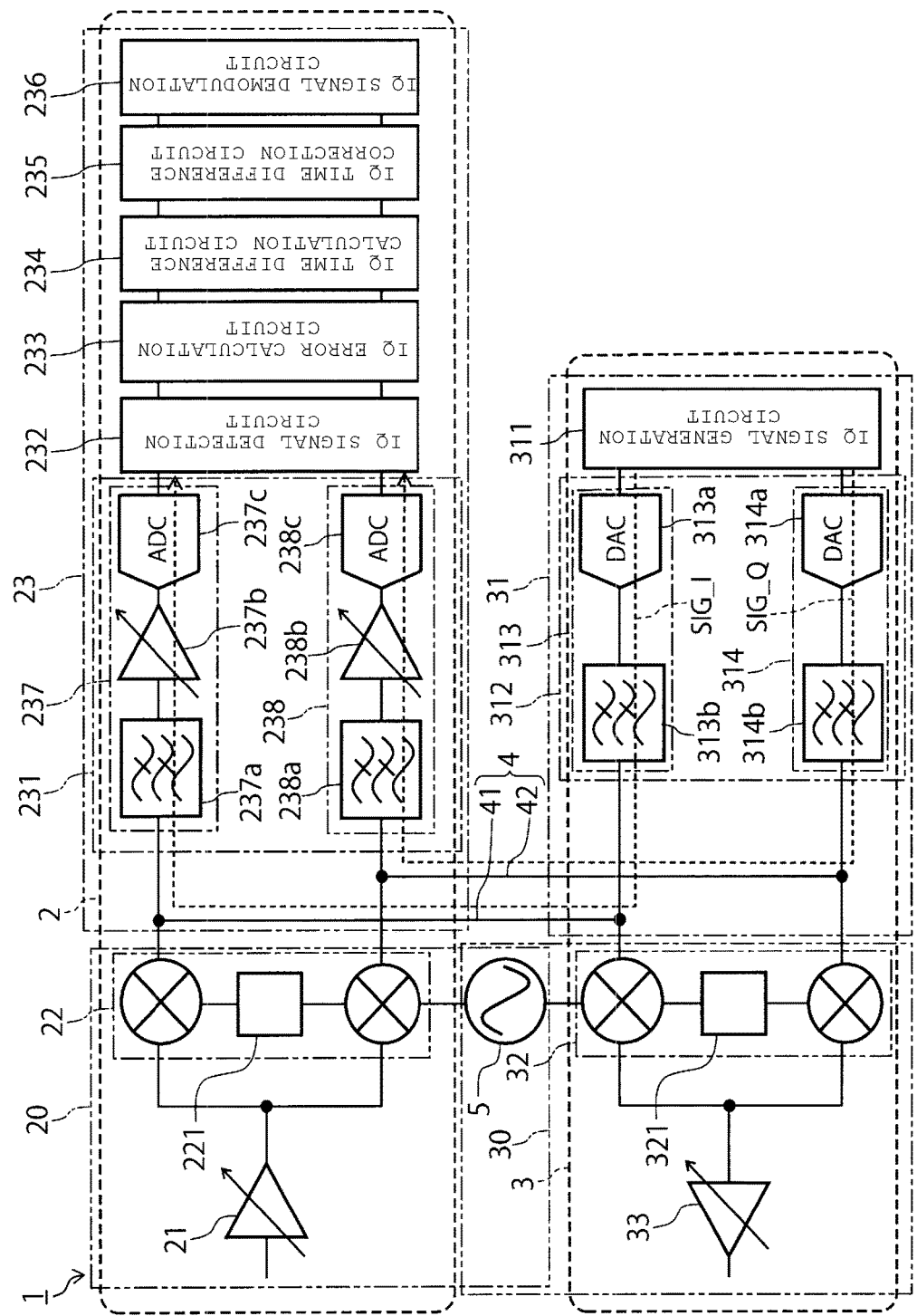
FIG. 1 is a block diagram illustrating a transceiver according to a first embodiment.

Embodiments provide a transmission and reception circuit, a transceiver, and a method of correcting a time difference of a signal capable of correcting a time difference between an I signal and an Q signal.

In general, according to an embodiment, a transmission and reception circuit includes a transmission circuit, a reception circuit, and a signal feedback path. The transmission path includes an output section, a signal generating circuit generating an I signal and a Q signal, and a transmission analog baseband circuit configured to perform digital to analog conversion of the generated I signal and Q signal. The reception circuit includes an input section, a reception analog baseband circuit performing analog-to-digital conversion of the transmitted I signal and Q signal, and a signal detection circuit that detects the analog-to-digital converted I signal and Q signal converted by the reception analog baseband circuit. The signal feedback path has a first end which is connected to the output section of the transmission circuit, and a second end which is connected to the input section of the reception circuit.

Hereinafter, embodiments according to an exemplary embodiment will be described with reference to the drawings. Such embodiments are not in any way intended to limit the exemplary embodiment. In addition, in the plurality of embodiments to be described below, the same reference numerals are given to same configuration units, and a repeated description thereof will be omitted.

First Embodiment

FIG. 1 is a block diagram for illustrating a transceiver 1 according to a first embodiment. The transceiver 1 according to the present embodiment can be used, for example, in a wireless communication apparatus such as a wireless LAN communication apparatus. As illustrated in FIG. 1, the transceiver 1 includes a receiver 2, a transmitter 3, a feedback path 4, and a local signal generator 5.

During normal operation of communicating with a partner communication apparatus (not illustrated), the receiver 2 receives a high frequency signal from the communication partner communication apparatus having a frequency within a use band. The reception signal of the receiver 2 includes an I signal and a Q signal. The reception signal is, for example, an orthogonal frequency division multiplexing (OFDM) signal. The receiver 2 includes a reception low noise amplifier 21 that is an example of a reception amplifier, a reception multiplier 22, and a reception circuit 23 in order from the upstream side in a signal flow direction. The reception low noise amplifier 21 and the reception multiplier 22 configure the local signal generator 5 together with a reception radio frequency (RF) circuit 20. The reception RF circuit 20 converts the reception signal into a baseband signal having a frequency lower than that of the signal having a frequency within the use band. The reception signal converted into the baseband signal is subjected to a process such as a filtering, amplifying, or analog-to-digital converting in a reception analog baseband circuit 231 of the reception circuit 23 and then demodulated.

During normal operation, the transmitter 3 transmits a signal having a frequency within the use band to the partner communication apparatus. The transmission signal of the transmitter 3 includes the I signal and the Q signal. The transmission signal is, for example, an OFDM signal. The transmitter 3 includes a transmission circuit 31, a transmission multiplier 32, and a transmission high-frequency amplifier 33 that is an example of a transmission amplifier in that order from the upstream side in a signal flow direction. The transmission multiplier 32 and the transmission high-frequency amplifier 33 configure the local signal generator 5 together with the transmission RF circuit 30. The transmission circuit 31 generates the transmission signal in a state of the baseband signal and transmits the generated transmission signal to the transmission RF circuit 30 after going through a process such as digital-analog conversion and filtering. The transmission RF circuit 30 converts the transmission signal, that is the baseband signal from the transmission circuit 31, into the high-frequency signal and transmits the converted high-frequency signal to the partner communication apparatus.

The transmission and reception circuit according to the present embodiment includes the transmission circuit 31, the feedback path 4, and the reception circuit 23.

Here, a delay time corresponding to variations in the processing speed of electronic components of the reception analog baseband circuit 231 is generated in the I signal and the Q signal of the reception signal as it passes through the reception analog baseband circuit 231. If the delay time of the I signal is different from the delay time of the Q signal, a time difference (hereinafter, referred to as an IQ time difference) between the I signal and the Q signal occurs. When the IQ time difference occurs, symbols assigned to the I signal and the Q signal cannot be appropriately demodulated, and the reception accuracy is deteriorated.

In order to appropriately demodulate the symbols, the transceiver 1 according to the first embodiment corrects the IQ time difference as an operation different from the normal operation. Hereinafter, the configuration of the transceiver for correcting the IQ time difference will be mainly described.

Transmission Circuit 31

The transmission circuit 31 includes an IQ signal generation circuit 311 that is an example of the signal generation circuit and a transmission analog baseband circuit 312 in that order from the upstream side of the signal flow direction. The transmission analog baseband circuit 312 includes a first transmission baseband circuit 313 and a second transmission baseband circuit 314. The first transmission baseband circuit 313 includes a first digital-analog converter 313a and a first transmission low-pass filter 313b in that order from the upstream side of the signal flow direction. The second transmission baseband circuit 314 includes a second digital-analog converter 314a and a second transmission low-pass filter 314b in that order from the upstream side of the signal flow direction.

The IQ signal generation circuit 311 generates an I signal SIG_I and a Q signal SIG_Q for correcting the IQ time difference.

Specifically, the IQ signal generation circuit 311 generates a first I signal and a second I signal having different frequencies as the I signal SIG_I. In addition, the IQ signal generation circuit 311 generates a first Q signal and a second Q signal having different frequencies as the Q signal SIG_Q.

The operation example of the transceiver 1 using the first I signal, the second I signal, the first Q signal, and the second Q signal will be described in the item "Correction of IQ time difference" to be descried below. Here, the operation example will be simply described as the "I signal SIG_I" and the "Q signal SIG_Q".

The transmission analog baseband circuit 312 performs digital-analog conversion of the I signal and the Q signal generated of the IQ signal generation circuit 311.

Specifically, the first transmission baseband circuit 313 performs digital-analog conversion of the I signal SIG_I generated of the IQ signal generation circuit 311 by the first digital-analog converter 313a. In addition, the first transmission baseband circuit 313 performs filtering to filter out a component of the frequency having a filter frequency or greater by passing the I signals SIG_I which are digital-analog converted by the first digital-analog converter 313a through a component having a signal passing frequency lower than the filtering frequency using the first transmission low-pass filter 313b.

The second transmission baseband circuit 314 performs the digital-analog conversion of the Q signal SIG_Q generated of the IQ signal generation circuit 311 by the second digital-analog converter 314a. In addition, the second transmission baseband circuit 314 performs filtering to filter out a component of the frequency having a filter frequency or greater by passing the Q signals SIG_Q which are digital-analog converted by the second digital-analog converter 314a through a component having a signal passing frequency lower than the filtering frequency using the second transmission low-pass filter 314b.

A delay time due to electronic components 313a and 313b configuring the first transmission baseband circuit 313 occurs in the I signal SIG_I passing through the first transmission baseband circuit 313. A delay time due to electronic components 314a and 314b configuring the second transmission baseband circuit 314 occurs in the Q signal SIG_Q passing through the second transmission baseband circuit 314. When the delay time of the first transmission baseband circuit 313 is different from the delay time of the second transmission baseband circuit 314, the IQ time difference of the transmission circuit 31 occurs.

Feedback Path 4

One end of the feedback path 4 is connected to the transmission analog baseband circuit 312 and the feedback path 4 transmits the I signal SIG_I and the Q signal SIG_Q which are digital-analog converted of the transmission analog baseband circuit 312 from one end to the other end of the feedback path 4.

Specifically, the feedback path 4 includes an I signal path 41 that connects the first transmission baseband circuit 313 and a first reception baseband circuit 237 to be described below as an example of the in-phase component path. One end of the I signal path 41 is connected between the first transmission baseband circuit 313 and the transmission multiplier 32, and the other end of the I signal path 41 is connected between the first reception baseband circuit 237 and the reception multiplier 22. The I signal SIG_I can be looped back from the first transmission baseband circuit 313 to the first reception baseband circuit 237 through the I signal path 41.

In addition, the feedback path 4 includes a Q signal path 42 that connects the second transmission baseband circuit 314 and a second reception baseband circuit 238 to be described below as an example of the orthogonal component path. One end of the Q signal path 42 is connected between the second transmission baseband circuit 314 and the transmission multiplier 32 and the other end of the Q signal path 42 is connected between the second reception baseband circuit 238 and the reception multiplier 22. The Q signal SIG_Q can be looped back from the second transmission baseband circuit 314 to the second reception baseband circuit 238 through the Q signal path 42.

Reception Circuit 23

The reception circuit 23 receives the I signal SIG_I and the Q signal SIG_Q which are transmitted from the transmission circuit 31 through the feedback path 4. The reception circuit 23 includes the reception analog baseband circuit 231, an IQ signal detection circuit 232 that is an example of the signal detection circuit, an IQ error calculation circuit 233, an IQ time difference calculation circuit 234 that is an example of the time difference detection circuit, an IQ time difference correction circuit 235 that is an example of a first correction circuit, and an IQ signal demodulation circuit 236 in that order from the upstream side in the signal flow direction.

The reception analog baseband circuit 231 includes the first reception baseband circuit 237 and the second reception baseband circuit 238. The first reception baseband circuit 237 includes a first reception low-pass filter 237a, a first variable gain amplifier 237b, and a first analog-digital converter 237c in order from the upstream side of the signal. The second reception baseband circuit 238 includes a second reception low-pass filter 238a, a second variable gain amplifier 238b, and a second analog-digital converter 238c in order from the upstream side of the signal.

The reception analog baseband circuit 231 is connected to the other end of the feedback path 4. The reception analog baseband circuit 231 performs analog-to-digital conversion of the I signal SIG_I and the Q signal SIG_Q which are transmitted through the feedback path 4.

Specifically, the first reception baseband circuit 237 performs filtering to filter out the I signals SIG_I component transmitted through the I signal path 41 having a frequency equal to or greater than the filtering frequency by causing the component having a frequency lower than the filtering frequency to pass through the first reception low-pass filter 237a. In addition, the first reception baseband circuit 237 amplifies the I signal SIG_I passed through the first reception low-pass filter 237a using the first variable gain amplifier 237b. In addition, the first reception baseband circuit 237 performs analog-to-digital conversion of the I signal SIG_I amplified by the first variable gain amplifier 237b using the first analog-digital converter 237c.

The second reception baseband circuit 238 performs filtering to filter out the Q signals SIG_Q component transmitted through the Q signal path 42 having a frequency equal to or greater than the filtering frequency by passing the signal through the second reception low-pass filter 238a. In addition, the second reception baseband circuit 238 amplifies the Q signal SIG_Q passed through the second reception low-pass filter 238a using the second variable gain amplifier 238b. In addition, the second reception baseband circuit 238 performs analog-to-digital conversion of the Q signal SIG_Q amplified by the second variable gain amplifier 238b using the second analog-digital converter 238c.

A delay time due to electronic components 237a, 237b, and 237c configuring the first reception baseband circuit 237 occurs in the I signal SIG_I passing through the first reception baseband circuit 237. A delay time due to electronic components 238a, 238b, and 238c configuring the second reception baseband circuit 238 occurs in the Q signal SIG_Q passing through the second reception baseband circuit 238. When the delay time of the first reception baseband circuit 237 is different from the delay time of the second reception baseband circuit 238, an IQ time difference of the reception circuit 23 occurs.

The IQ signal detection circuit 232 detects the I signal SIG_I analog-to-digital converted by the first analog-digital converter 237c and the Q signal SIG_Q analog-tp-digital converted by the second analog-digital converter 238c, which is a property of each signal. For example, the IQ signal detection circuit 232 detects electric power $<I>^2$ and $<Q>^2$ or an IQ correlation value $<IQ>$ to be described below as detection of the I signal SIG_I and the Q signal SIG_Q.

The IQ error calculation circuit 233 calculates an error between the I signal SIG_I and the Q signal SIG_Q detected by the IQ signal detection circuit 232. The error between the I signal SIG_I and the Q signal SIG_Q is, for example, a phase error (hereinafter, referred to as an IQ phase error) between the I signal SIG_I and the Q signal SIG_Q. The IQ phase error is shifted by 90° of a phase error between the I signal SIG_I and the Q signal SIG_Q. The error between the I signal SIG_I and the Q signal SIG_Q may further include an amplitude error.

The IQ time difference calculation circuit 234 calculates the IQ time difference based on the error between the I signal SIG_I and the Q signal SIG_Q calculated by the IQ error calculation circuit 233.

The IQ time difference correction circuit 235 corrects the IQ time difference calculated by the IQ time difference calculation circuit 234.

The IQ signal demodulation circuit 236 demodulates a reception signal based on the IQ time difference corrected by the IQ time difference correction circuit 235.

During normal operation, that is, during normal transmission operation, digital-analog conversion of the transmission signal is performed by the digital-analog converters 313a and 314a, and filtering of the transmission signal is performed by the transmission low-pass filters 313b and 314b. The transmission signal may be generated by the IQ signal generation circuit 311, or may be generated by a circuit other than the IQ signal generation circuit 311. In addition, during normal operation, the transmission signal after filtering is subjected to modulation by the transmission RF circuit 30. Specifically, by multiplying a local signal generated by the local signal generator 5 by the transmission signal, the transmission multiplier 32 performs conversion of the transmission signal from the baseband signal to the high-frequency signal, that is, performs up-converting. The transmission multiplier 32 may include a frequency divider 321 that frequency-divides the local signal and multiplies the local signal frequency-divided by the frequency divider 321 by the transmission signal. In addition, the transmission high-frequency amplifier 33 amplifies the transmission signal multiplied by the local signal. The transmission signal amplified by the transmission high-frequency amplifier 33 is transmitted from an antenna (not illustrated) toward the partner communication apparatus.

In addition, during normal operation, that is, during normal reception operation, demodulation of the reception signal from the partner communication apparatus received by the antenna (not illustrated) is performed by the reception RF circuit 20. Specifically, the reception low noise amplifier 21 amplifies the reception signal. By multiplying the reception signal amplified by the reception low noise amplifier 21 by the local signal generated by the local signal generator 5, the reception multiplier 22 performs conversion of the reception signal from the high-frequency signal to the baseband signal, that is, performs down-converting. The reception multiplier 22 may include a frequency divider 221 that frequency-divides the local signal and multiplies the local signal frequency-divided by the frequency divider 221 by the local signal. In addition, during normal operation, filtering by the reception low-pass filters 237a and 238a, amplifying by the variable gain amplifiers 237b and 238b, and analog-to-digital converting by the first analog-digital converters 237c and 238c of the reception signal demodulated by the reception RF circuit 20 are performed.

Correction of IQ Time Difference

Next, correction of the IQ time difference as an operation example of the transceiver 1 will be described. In the flowing operation example, the IQ signal generation circuit 311 generates a first I signal and a first Q signal having a first frequency $f_1$ and a second I signal and a second Q signal having a second frequency $f_2$, as sinusoidal I signal SIG_I and Q signal SIG_Q having different frequencies.

In addition, the IQ time difference calculation circuit 234 calculates the IQ time difference based on the first and second I signals and the first and second Q signals detected by the IQ signal detection circuit 232 through the transmission analog baseband circuit 312, the feedback path 4, and the reception analog baseband circuit 231. Hereinafter, the operation example of the transceiver 1 will be described in detail.

Firstly, the IQ signal generation circuit 311 generates the first I signal and the first Q signal. The IQ signal generation circuit 311 outputs the generated first I signal to the first digital-analog converter 313a of the first transmission baseband circuit 313. In addition, the IQ signal generation circuit 311 outputs the generated first Q signal to the second digital-analog converter 314a of the second transmission baseband circuit 314.

Next, the first digital-analog converter 313a performs digital-analog conversion of the first I signal input by the IQ signal generation circuit 311 and outputs the first I signal after the digital-analog conversion to the first transmission low-pass filter 313b. In addition, the second digital-analog converter 314a performs digital-analog conversion of the first Q signal input from the IQ signal generation circuit 311 and outputs the first Q signal after the digital-analog conversion to the second transmission low-pass filter 314b.

Next, the first transmission low-pass filter 313b performs filtering of the first I signal after the digital-analog conversion input from the first digital-analog converter 313a and outputs the first I signal after filtering. In addition, the second transmission low-pass filter 314b performs filtering of the first Q signal after digital-analog conversion input from the second digital-analog converter 314a and outputs the first Q signal after filtering.

Thus, the first I signal, after filtering by the first transmission low-pass filter 313b, is transmitted to the first reception baseband circuit 237 through the I signal path 41 and input to the first reception low-pass filter 237a. In addition, the first Q signal, after filtering by the second transmission low-pass filter 314b, is transmitted to the second reception baseband circuit 238 through the Q signal path 42 and input to the second reception low-pass filter 238a.

Next, the first reception low-pass filter 237a performs filtering of the first I signal input from the first transmission low-pass filter 313b through the I signal path 41 and outputs the first I signal after filtering to the first variable gain amplifier 237b. In addition, the second reception low-pass filter 238a performs filtering of the first Q signal input from the second transmission low-pass filter 314b through the Q signal path 42 and outputs the first Q signal after filtering to the second variable gain amplifier 238b.

Next, the first variable gain amplifier 237b amplifies the first I signal after filtering, input from the first reception low-pass filter 237a, and outputs the first I signal after amplifying to the first analog-digital converter 237c. In addition, the second variable gain amplifier 238b amplifies the first Q signal after filtering, input from the second reception low-pass filter 238a, and outputs the first Q signal after amplifying to the second analog-digital converter 238c.

Next, the first analog-digital converter 237c performs analog to digital conversion of the first I signal after amplifying input from the first variable gain amplifier 237b and outputs the first I signal after analog to digital conversion thereof to the IQ signal detection circuit 232. In addition, the second analog-digital converter 238c performs analog to digital conversion of the first Q signal after amplifying output from the second variable gain amplifier 238b and outputs the first Q signal after analog to digital conversion thereof to the IQ signal detection circuit 232.

Next, the IQ signal detection circuit 232 detects the first I signal, after analog to digital conversion thereof by the first analog-digital converter 237c and the first Q signal, after analog to digital conversion thereof by the second analog-digital converter 238c.

For example, the IQ signal detection circuit 232 detects the electric power $<I>^2$ of the first I signal according to Expression (1) below. In addition, the IQ signal detection circuit 232 outputs the electric power $<Q>^2$ of the first Q signal according to Expression (2) below. In addition, the IQ signal detection circuit 232 detects the IQ correlation value $<IQ>$ according to Expression (3) below. In Expressions (1) to (3), N represents the total number of samples of each of the first I signal and the first Q signal sequentially sampled for each predetermined sampling period. n represents a sample number of each of the first I signal and the first Q signal from 0 to N−1.

$$\langle I^2 \rangle = \frac{1}{N} \sum_{n=0}^{N-1} I^2(n) \quad (1)$$

$$\langle Q^2 \rangle = \frac{1}{N} \sum_{n=0}^{N-1} Q^2(n) \quad (2)$$

$$\langle IQ \rangle = \frac{1}{N} \sum_{n=0}^{N-1} I(n)Q(n) \quad (3)$$

Next, the IQ error calculation circuit 233 calculates the error between both the I and the Q signals based on the first I signal and the first Q signal detected by the IQ signal detection circuit 232. For example, the IQ error calculation circuit 233 calculates an IQ amplitude error $\alpha$ that is an amplitude error between the first I signal and the first Q signal according to Expression (4) below based on the electric power $<I>^2$ of the first I signal and the electric power $<Q>^2$ of the first Q signal detected by the IQ signal detection circuit 232. In addition, the IQ error calculation circuit 233 calculates a first phase error $\theta_1$ that is a phase error between the first I signal and the first Q signal according to Expression (5) below based on the electric power $<I>^2$ of the first I signal, the electric power $<Q>^2$ of the first Q signal, and the IQ correlation value $<IQ>$ detected by the IQ signal detection circuit 232.

$$\alpha = \sqrt{\frac{\langle Q^2 \rangle}{\langle I^2 \rangle}} \quad (4)$$

$$\theta_1 = \arcsin\frac{\langle IQ \rangle}{\sqrt{\langle I^2 \rangle \langle Q^2 \rangle}} \quad (5)$$

Next, the IQ signal generation circuit 311 generates the second I signal and the second Q signal. The transceiver 1 processes the second I signal through the same signal path as the first I signal, and processes the second Q signal through the same signal path as the first Q signal. Accordingly, the IQ error calculation circuit 233 calculates the IQ amplitude error between the second I signal and the second Q signal according to Expression (4). In addition, the IQ error calculation circuit 233 calculates a second phase error $\theta_2$ that is a phase error between the second I signal and the second Q signal according to Expression (5).

Next, the IQ time difference calculation circuit 234 calculates an IQ time difference T according to the following expression expressed as expression (6) below is the IQ time difference of the entire transceiver 1 which is the sum of the IQ time difference of the transmission circuit 31 and the IQ time difference of the reception circuit 23.

$$T = \frac{(\theta_1 - \theta_2)}{(f_1 - f_2)} \times \frac{1}{360} \quad (6)$$

Figure 2:
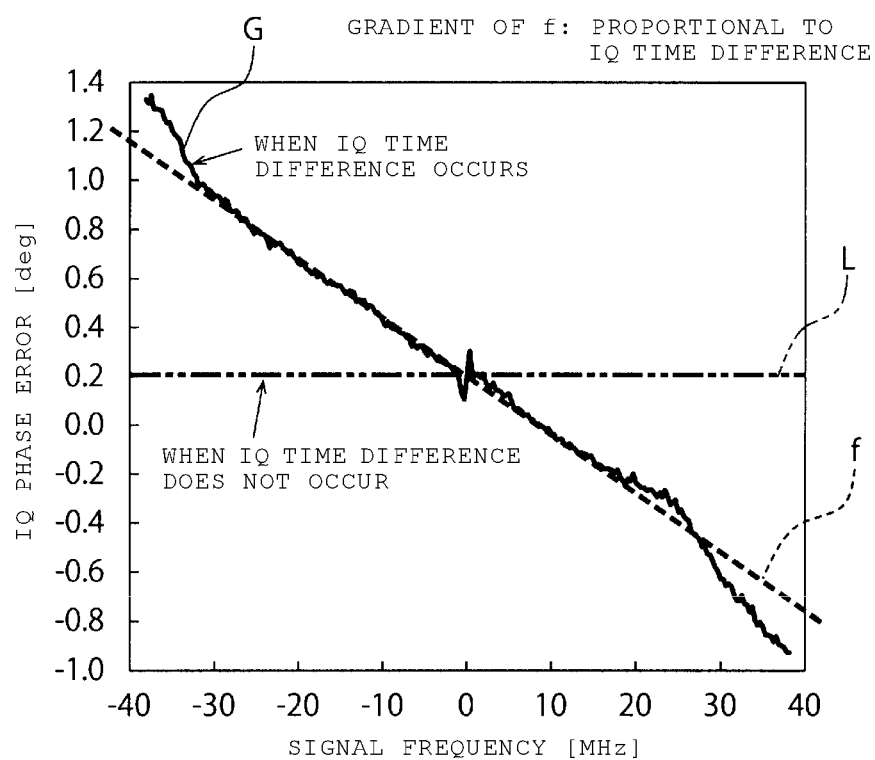
FIG. 2 is an explanatory diagram illustrating correction of an IQ time difference as an operation example of the transceiver according to the first embodiment.

FIG. 2 is an explanatory diagram illustrating correction of an IQ time difference as an operation example of the transceiver 1 according to the first embodiment. FIG. 2 illustrates a relationship between the signal frequencies of the I signal and the Q signal (horizontal axis) and the IQ phase error (vertical axis). In FIG. 2, as indicated by a virtual line L, when the IQ time difference does not occur, the IQ phase error is substantially constant (for example, in FIG. 2, about 0.2 deg) regardless of the signal frequency. With respect to this, as indicated in a line G of the graph in FIG. 2, when the IQ time difference does occur, the IQ phase error changes depending on the signal frequency. The line G in FIG. 2 can be approximated by a linear function f indicated by a broken line in FIG. 2. The gradient of the linear function f is a value proportional to the IQ time difference. The calculation of the IQ time difference according to Expression (6) corresponds to a process for calculating the gradient of the linear function f in FIG. 2. A correction of IQ time difference to be described below corresponds to a process for reducing the gradient of the linear function f.

Next, the IQ time difference correction circuit 235 corrects the IQ time difference calculated by the IQ time difference calculation circuit 234. For example, the IQ time difference correction circuit 235 includes a finite impulse response (FIR) filter and may acquire an IQ signal in which the time difference is corrected by convoluting a FIR filter coefficient extracted based on the IQ time difference with the IQ signal input to the IQ time difference correction circuit 235.

Here, a main cause of occurrence of the IQ time difference is a delay time in at least one of the analog baseband circuits 231 and 312. According to the first embodiment, the I signal and the Q signal can be individually looped back from the transmission analog baseband circuit 312 to the reception analog baseband circuit 231 through the feedback path 4 before the I signal and the Q signal are mixed in the transmission RF circuit 30. Accordingly, in comparison with a case where the I signal and the Q signal are looped back through RF circuits 30 and 20, the IQ time difference can be easily and appropriately calculated. Accordingly, the IQ time difference can be easily and appropriately corrected.

Second Embodiment

Figure 3:
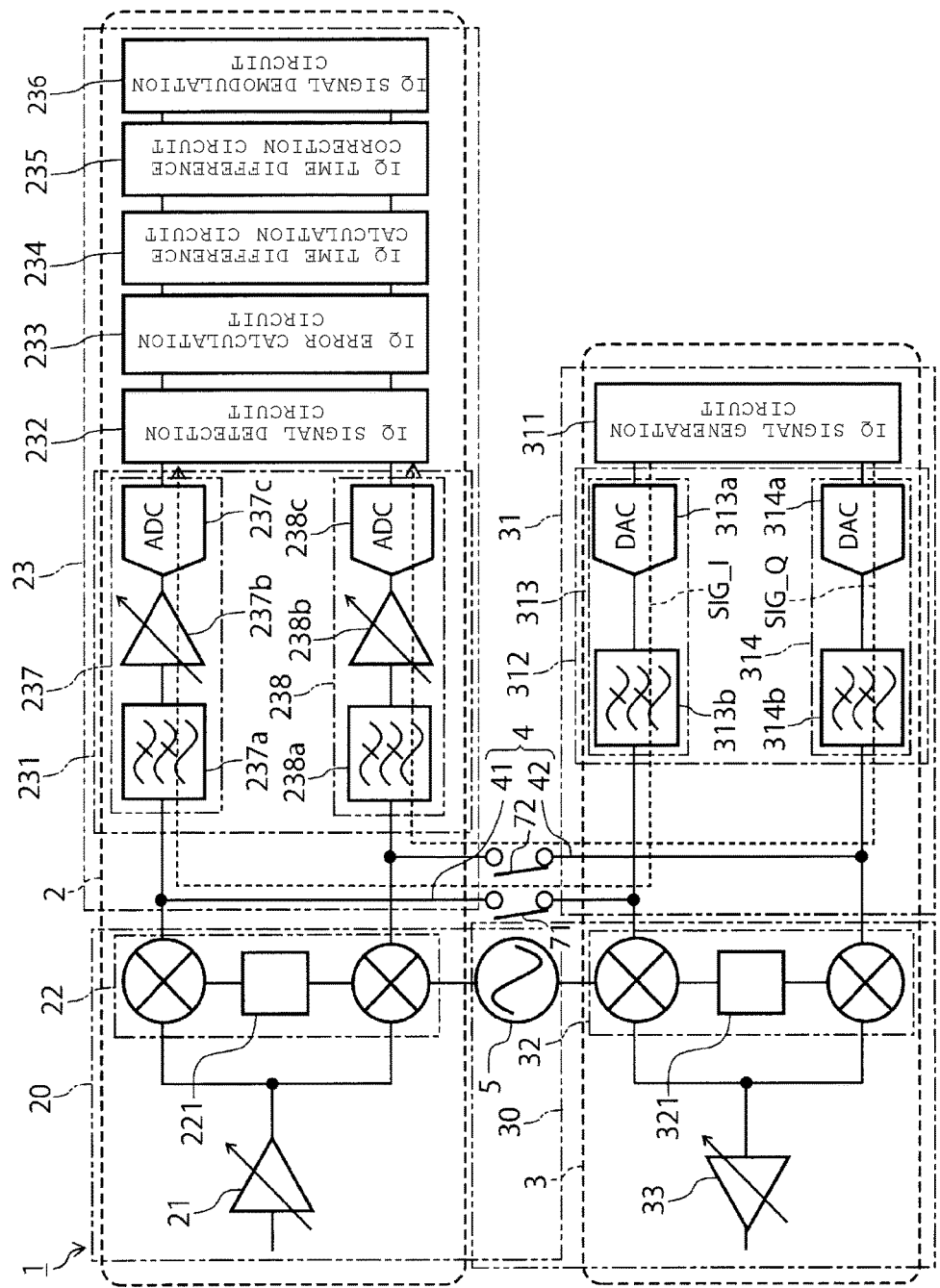
FIG. 3 is a block diagram illustrating a transceiver according to a second embodiment.

Next, a second embodiment for opening and closing the feedback path 4 using a switch will be described. FIG. 3 is a block diagram illustrating the transceiver 1 according to the second embodiment.

As illustrated in FIG. 3, the transceiver 1 according to the second embodiment further includes an I signal switch 71 that opens and closes the I signal path 41 and a Q signal switch 72 that opens and closes the Q signal path 42 and thereby open and close the feedback path 4, in addition to a configuration of the transceiver 1 according to the first embodiment.

During the IQ time difference correction, the I signal switch 71 and the Q signal switch 72 are closed. On the other hand, during normal operation, the I signal switch 71 and the Q signal switch 72 are open, as shown in FIG. 3.

According to the second embodiment, while securing a sample to determine an appropriate correction of the IQ time difference during a IQ time difference correction procedure, during normal operation, it is possible to prevent a transmission signal from flowing from the transmission circuit 31 to reception circuit 23 and the reception signal from flowing from the reception circuit 23 to the transmission circuit 31. Accordingly, according to the second embodiment, transmission and reception accuracy can be further improved compared with the first embodiment.

Third Embodiment

Figure 4:
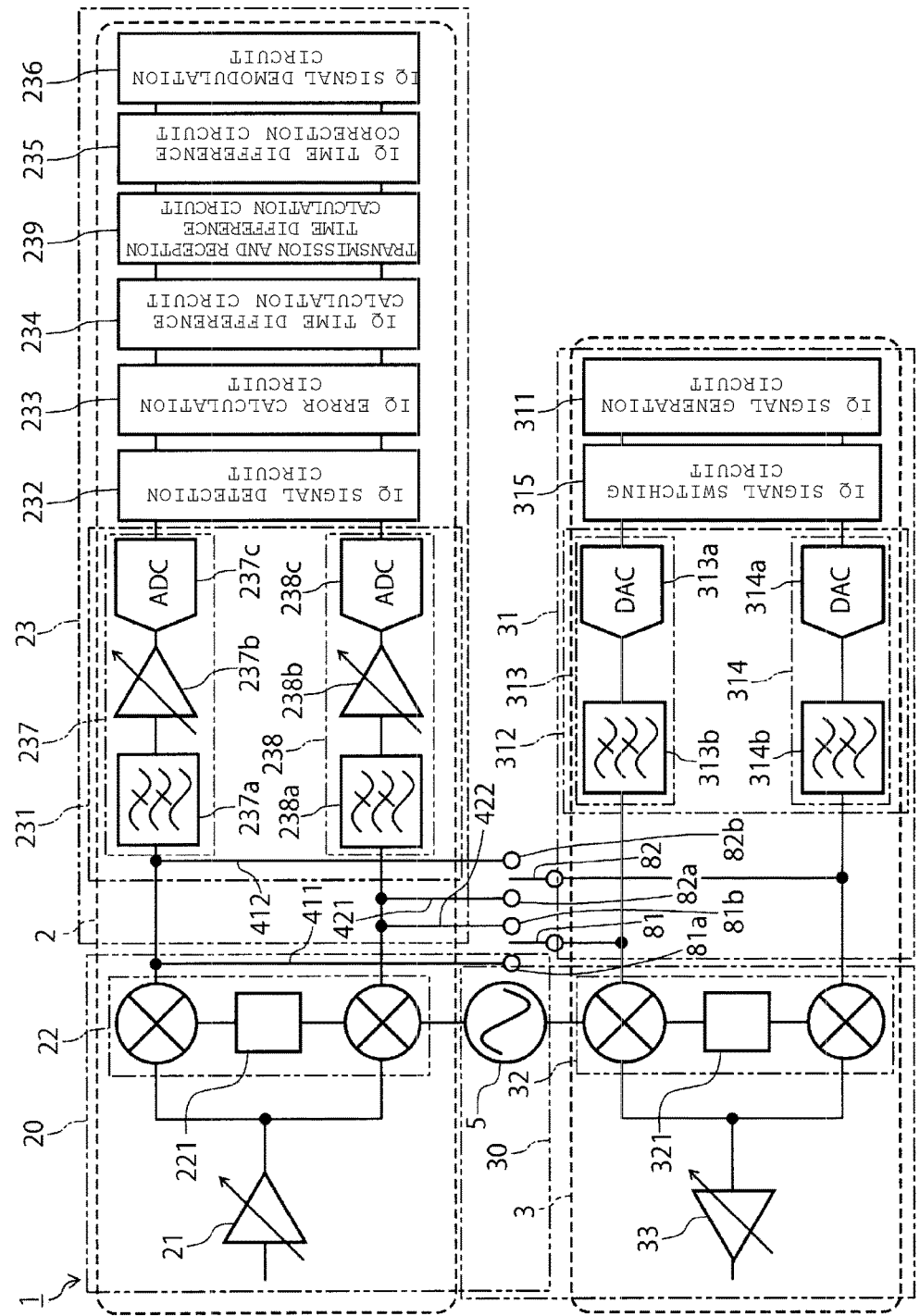
FIG. 4 is a block diagram illustrating a transceiver according to a third embodiment.

Next, a third embodiment for independently calculating an IQ time difference of the reception circuit 23 and the IQ time difference of the transmission circuit 31 will be described. FIG. 4 is a block diagram illustrating the transceiver 1 according to the third embodiment.

In the first embodiment, the IQ time difference T of the entire transceiver 1 is calculated according to Expression (6) by the IQ time difference calculation circuit 234. With respect to this, as illustrated in FIG. 4 in the reception circuit 23, the transceiver 1 according to the third embodiment includes a transmission and reception time difference calculation circuit 239 that is an example of the time difference detection circuit. The transmission and reception time difference calculation circuit 239 independently calculates the IQ time difference of the reception circuit 23 and the IQ time difference of the transmission circuit 31 based on the IQ time difference T of the entire transceiver 1 calculated by the IQ time difference calculation circuit 234.

Since the transmission and reception time difference calculation circuit 239 is set to independently calculate the IQ time difference of the reception circuit 23 and the IQ time difference of the transmission circuit 31, as illustrated in FIG. 4, the transceiver 1 according to the third embodiment includes an IQ signal switching circuit 315 that is an example of the signal output circuit in the transmission circuit 31.

The IQ signal switching circuit 315 outputs the I signal generated by the IQ signal generation circuit 311 to the first transmission baseband circuit 313 and can execute a first operation that outputs the Q signal generated by the IQ signal generation circuit 311 to the second transmission baseband circuit 314.

In addition, the IQ signal switching circuit 315 outputs the I signal generated by the IQ signal generation circuit 311 to the second transmission baseband circuit 314 and can execute a second operation that outputs the Q signal generated by the IQ signal generation circuit 311 to the first transmission baseband circuit 313.

By sequentially executing the first operation and the second operation, the IQ signal switching circuit 315 switches output destinations of the I signal and the Q signal between the first transmission baseband circuit 313 and the second transmission baseband circuit 314. Either the first operation or the second operation may be performed first.

By executing the first operation and the second operation, the IQ time difference calculation circuit 234 calculates two types of IQ time differences, T and $T_{swap}$, which are used to independently calculate the IQ time difference of the reception circuit 23 and the IQ time difference of the transmission circuit 31 by the transmission and reception time difference calculation circuit 239. The details of this are now described.

Since the I signal and the Q signal are looped back in accordance with the first operation and the second operation, as illustrated in FIG. 4, the I signal path 41 includes a first I signal path 411 that is an example of a first in-phase component path, a second I signal path 412 that is an example of a second in-phase component path, a first Q signal path 421 that is an example of a first orthogonal component path, and a second Q signal path 422 that is an example of a second orthogonal component path. In addition, the transceiver 1 includes a first IQ signal switching switch 81 that is an example of a first switch and a second IQ signal switching switch 82 that is an example of a second switch.

As illustrated in FIG. 4, one end of the first I signal path 411 is connected to a first junction 81a with the first IQ signal switching switch 81 and the other end of the first I signal path 411 is connected between the first reception low-pass filter 237a and the reception multiplier 22. One end of the second I signal path 412 is connected to a second junction 82b with the second IQ signal switching switch 82 and the other end of the second I signal path 412 is connected between the first reception low-pass filter 237a and the reception multiplier 22.

In addition, as illustrated in FIG. 4, one end of the first Q signal path 421 is connected to a first junction 82a with the second IQ signal switching switch 82, and the other end of the first Q signal path 421 is connected between the second reception low-pass filter 238a and the reception multiplier 22. One end of the second Q signal path 422 is connected to a second junction 81b with the first IQ signal switching switch 81, and the other end of the second Q signal path 422 is connected between the second reception low-pass filter 238a and the reception multiplier 22.

The first IQ signal switching switch 81 is connected between the first transmission low-pass filter 313b and the transmission multiplier 32 and can be turned on (closed), that is, can be connected to any one of the first junction 81a and the second junction 81b, or remain in the open position as shown in FIG. 4. The second IQ signal switching switch 82 is connected between the second transmission low-pass filter 314b and the transmission multiplier 32 and can be turned on (closed) to any one of the first junction 82a and the second junction 82b or remain in the open position as shown in FIG. 4.

During executing of the first operation, the first IQ signal switching switch 81 is switched to connect to the first junction 81a side to connect the first I signal path 411. In addition, the second IQ signal switching switch 82 is switched to connect to the first junction 82a side to connect the first Q signal path 421. By connecting switch 81 to the first I signal path 411, the first transmission baseband circuit 313 is connected to the first reception baseband circuit 237. In addition, by connecting switch 82 to the first Q signal path 421, the second transmission baseband circuit 314 is connected to the second reception baseband circuit 238.

In a state where the first I signal path 411 and the first Q signal path 421 are connected through switches 81, 82 respectively, the IQ signal generation circuit 311 sequentially executes generation of the first I signal and the first Q signal having the first frequency $f_1$ and generation of the second I signal and the second Q signal having the second frequency $f_2$ as described in the first embodiment. In accordance with this, the IQ signal detection circuit 232 sequentially executes detection of the first I signal and the first Q signal and detection of the second I signal and the second Q signal.

The IQ error calculation circuit 233 calculates the first phase error $\theta_1$ based on the first I signal and the first Q signal detected by the IQ signal detection circuit 232 in the same manner as the first embodiment. In addition, the IQ error calculation circuit 233 calculates the second phase error $\theta_2$ based on the second I signal and the second Q signal detected by the IQ signal detection circuit 232. The IQ time difference calculation circuit 234 calculates the IQ time difference T of the entire transceiver 1 based on the first phase error $\theta_1$ and the second phase error $\theta_2$ calculated by the IQ error calculation circuit 233 in the same manner as the first embodiment. Hereinafter, the IQ time difference T is also referred to as the IQ time difference T before IQ switching.

During executing of the second operation, the first IQ signal switching switch 81 is connected to the second junction 81b to connect to the second Q signal path 422. In addition, the second IQ signal switching switch 82 is connected to the second junction 82b side to connect to the second I signal path 412. By connecting to the second I signal path 412, the second transmission baseband circuit 314 is connected to the first reception baseband circuit 237. In addition, by connecting to the second Q signal path 422, the first transmission baseband circuit 313 is connected to the second reception baseband circuit 238.

In a state where the second I signal path 412 and the second Q signal path 422 are connected with switches 81, 82 respectively, the IQ signal generation circuit 311 sequentially executes generation of the sinusoidal third I signal (the third in-phase component signal) and third Q signal (third orthogonal component signal) having a third frequency $f_3$ and generation of the sinusoidal fourth I signal (fourth in-phase component signal) and fourth Q signal (fourth orthogonal component signal) having a fourth frequency $f_4$. In accordance with this, the IQ signal detection circuit 232 sequentially executes detection of the third I signal and the third Q signal, and detection of the fourth I signal and the fourth Q signal.

The IQ error calculation circuit 233 calculates a third phase error $\theta_3$ that is a phase error between the third I signal and the third Q signal based on the third I signal and the third Q signal detected by the IQ signal detection circuit 232. In addition, the IQ error calculation circuit 233 calculates a fourth phase error $\theta_4$ that is a phase error between the fourth I signal and the fourth Q signal based on the fourth I signal and the fourth Q signal detected by the IQ signal detection circuit 232. In addition, the IQ time difference calculation circuit 234 calculates the IQ time difference $T_{swap}$ of the entire transceiver 1 based on the third phase error $\theta_3$ and the fourth phase error $\theta_4$ calculated by the IQ error calculation circuit 233. Hereinafter, the IQ time difference $T_{swap}$ is also referred to as the IQ time difference $T_{swap}$ after IQ switching.

The transmission and reception time difference calculation circuit 239 independently calculates an IQ time difference $D_{RX}$ of the reception circuit 23 and an IQ time difference $D_{TX}$ of the transmission circuit 31 based on the IQ time difference T before IQ switching and the IQ time difference $T_{swap}$ after IQ switching which are calculated by the IQ time difference calculation circuit 234. Regarding calculation of the IQ time difference $D_{RX}$ of the reception circuit 23 and the IQ time difference $D_{TX}$ of the transmission circuit 31, the operation examples will be described below.

The IQ time difference correction circuit 235 corrects the IQ time difference $D_{RX}$ of the reception circuit 23 calculated by the transmission and reception time difference calculation circuit 239.

Operation Example

Figure 5:
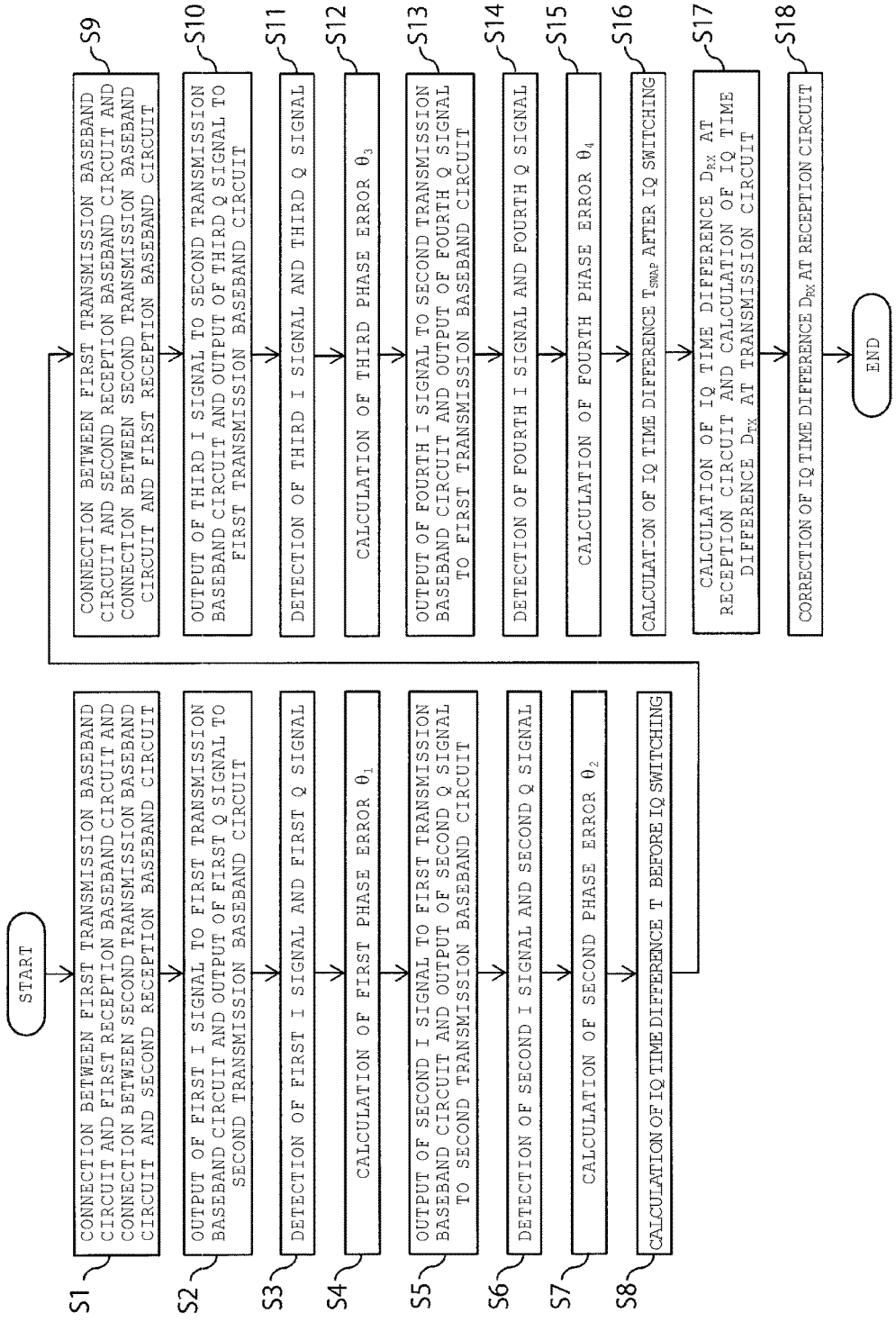
FIG. 5 is a flowchart illustrating an operation example of the transceiver according to the third embodiment.
Figure 6:
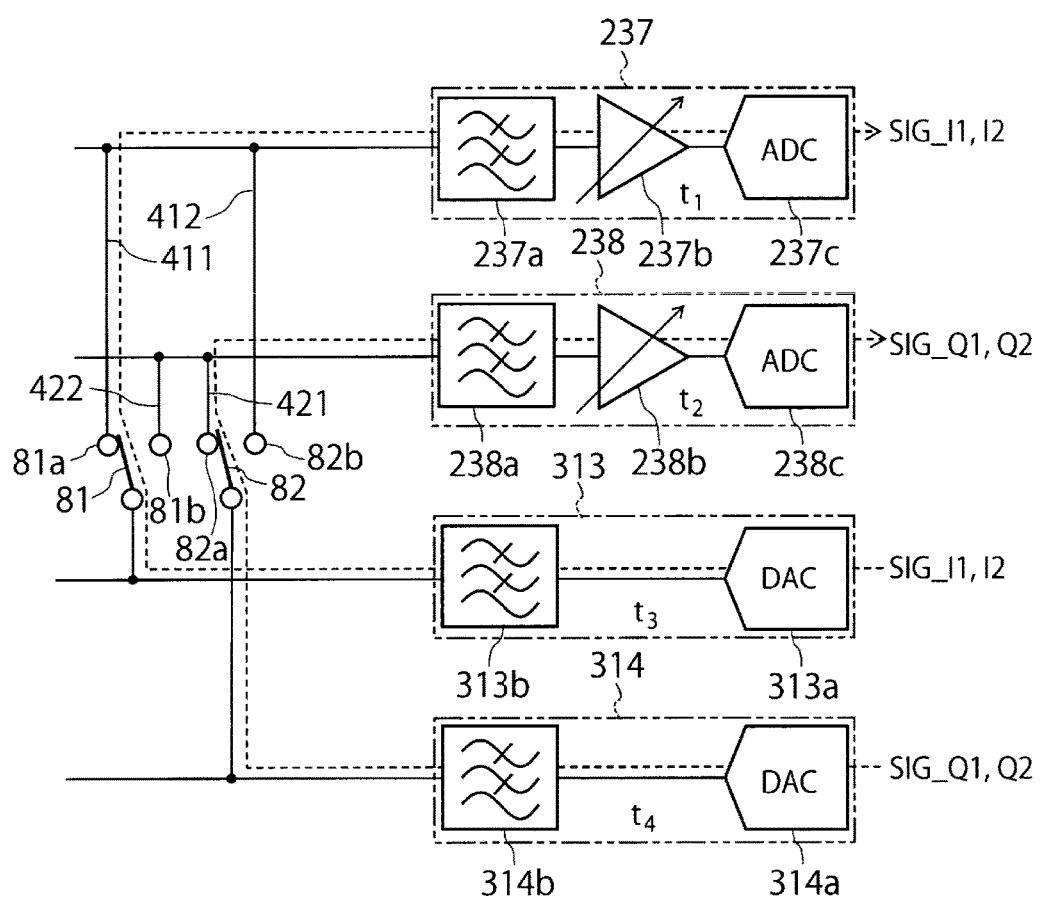
FIG. 6 is an explanatory diagram illustrating calculation of the IQ time difference before IQ switching in the operation example of the transceiver according to the third embodiment.

Next, an operation example of the transceiver 1 according to a third embodiment will be described. FIG. 5 is a flow chart illustrating an operation example of the transceiver 1 according to the third embodiment. FIG. 6 is an explanatory diagram illustrating calculation of the IQ time difference T before IQ switching in the operation example of the transceiver 1 according to the third embodiment.

As illustrated in FIGS. 5 and 6, firstly, by connecting the first I signal path 411 to the first IQ signal switching switch 81, the first IQ signal switching switch 81 connects the first transmission baseband circuit 313 and the first reception baseband circuit 237. In addition, by connecting the first Q signal path 421 to the second IQ signal switching switch 82, the second IQ signal switching switch 82 connects the second transmission baseband circuit 314 and the second reception baseband circuit 238 (Step S1).

Next, the IQ signal generation circuit 311 generates the first I signal and the first Q signal, and the IQ signal switching circuit 315 outputs the first I signal to the first transmission baseband circuit 313 and outputs the first Q signal to the second transmission baseband circuit 314 by the first operation (Step S2). At this time, the first frequency $f_1$ difference between the first I signal and the first Q signal may be −25 MHz.

As indicated by the broken line in FIG. 6, after digital-analog conversion by the first digital-analog converter 313a and filtering by the first transmission low-pass filter 313b are performed, a first I signal SIG_I1 output to the first transmission baseband circuit 313 is looped back to the first reception baseband circuit 237 through the first I signal path 411. At this time, a delay time $t_3$ due to the first transmission baseband circuit 313 is generated in the first I signal SIG_I1.

In addition, after the digital to analog conversion by the second digital-analog converter 314a and filtering by the second transmission low-pass filter 314b are performed, a first Q signal SIG_Q1 output to the second transmission baseband circuit 314 is looped back to the second reception baseband circuit 238 through the first Q signal path 421. At this time, a delay time $t_4$ due to the second transmission baseband circuit 314 is generated in the first Q signal SIG_Q1.

Next, after filtering by the first reception low-pass filter 237a, amplifying by the first variable gain amplifier 237b, analog-to-digital conversion by the first analog-digital converter 237c are performed, the first I signal SIG_I1 looped back to the first reception baseband circuit 237 is input to the IQ signal detection circuit 232. At this time, a delay time $t_1$ due to the first reception baseband circuit 237 is generated in the first I signal SIG_I1. In addition, at this time, since the delay time $t_3$ due to the first transmission baseband circuit 313 has been already generated in the first I signal SIG_I1, the total delay time of the first I signal SIG_I1 is $t_1+t_3$.

In addition, after filtering by the second reception low-pass filter 238a, amplifying by second variable gain amplifier 238b, analog to digital conversion by second analog-digital converter 238c are performed, the first Q signal SIG_Q1 looped back to the second reception baseband circuit 238 is input to the IQ signal detection circuit 232. At this time, a delay time $t_2$ due to the second reception baseband circuit 238 is generated in the first Q signal SIG_Q1. In addition, at this time, since the delay time $t_4$ due to the second transmission baseband circuit 314 has been already generated in the first Q signal SIG_Q1, the total delay time of the first Q signal SIG_Q1 is $t_2+t_4$.

As illustrated in FIG. 5, the IQ signal detection circuit 232 detects the input first I signal SIG_I1 and first Q signal SIG_Q1 (Step S3). For example, the IQ signal detection circuit 232 detects the electric power $<I>^2$ of the first I signal SIG_I1 indicated in Expression (1), the electric power $<Q>^2$ of the first Q signal SIG_Q1 indicated in Expression (2), and the IQ correlation value $<IQ>$ between the first I signal SIG_I1 and the first Q signal SIG_Q1 indicated in Expression (3).

After the first I signal SIG_I1 and the first Q signal SIG_Q1 are detected, the IQ error calculation circuit 233 calculates the first phase error $\theta_1$ according to Expression (5) (Step S4).

Next, the IQ signal generation circuit 311 generates the second I signal and the second Q signal, and the IQ signal switching circuit 315 outputs the second I signal to the first transmission baseband circuit 313 and outputs the second Q signal to the second transmission baseband circuit 314 by the first operation (Step S5). At this time, the second frequency $f_2$ difference between the second I signal and the second Q signal may be +25 MHz.

As indicated by the broken line in FIG. 6, after digital to analog conversion by the first digital-analog converter 313a and filtering by the first transmission low-pass filter 313b are performed, a second I signal SIG_I2 output to the first transmission baseband circuit 313 is looped back to the first reception baseband circuit 237 through the first I signal path 411. At this time, a delay time $t_3$ due to the first transmission baseband circuit 313 is generated in the second I signal SIG_I2.

In addition, after the digital to analog conversion by the second digital-analog converter 314a and filtering by the second transmission low-pass filter 314b are performed, a second Q signal SIG_Q2 output to the second transmission baseband circuit 314 is looped back to the second reception baseband circuit 238 through the first Q signal path 421. At this time, the delay time $t_4$ due to the second transmission baseband circuit 314 is generated in the second Q signal SIG_Q2.

Next, after filtering by the first reception low-pass filter 237a, amplifying by the first variable gain amplifier 237b, and analog to digital conversion by the first analog-digital converter 237c are performed, the second I signal SIG_I2 looped back to the first reception baseband circuit 237 is input to the IQ signal detection circuit 232. At this time, the delay time $t_1$ due to the first reception baseband circuit 237 is generated in the second I signal SIG_I2. In addition, at this time, since the delay time $t_3$ due to the first transmission baseband circuit 313 has been already generated in the second I signal SIG_I2, the total delay time of the second I signal SIG_I2 is $t_1+t_3$.

In addition, after filtering by the second reception low-pass filter 238a, amplifying by second variable gain amplifier 238b, and analog to digital conversion by second analog-digital converter 238c are performed, the second Q signal SIG_Q2 looped back to the second reception baseband circuit 238 is input to the IQ signal detection circuit 232. At this time, the delay time $t_2$ due to the second reception baseband circuit 238 is generated in the second Q signal SIG_Q2. In addition, at this time, since the delay time $t_4$ due to the second transmission baseband circuit 314 has been already generated in the second Q signal SIG_Q2, the total delay time of the second Q signal SIG_Q2 is $t_2+t_4$.

As illustrated in FIG. 5, the IQ signal detection circuit 232 detects the input second I signal SIG_I2 and second Q signal SIG_Q2 (Step S6). For example, the IQ signal detection circuit 232 detects the electric power $<I>^2$ of the second I signal SIG_I2, the electric power $<Q>^2$ of the second Q signal SIG_Q2, and the IQ correlation value $<IQ>$ between the second I signal SIG_I2 and the second Q signal SIG_Q2.

After the second I signal SIG_I2 and the second Q signal SIG_Q2 are detected, the IQ error calculation circuit 233 calculates the second phase error $\theta_2$ according to Expression (5) (Step S7).

After the first phase error $\theta_1$ and the second phase error $\theta_2$ are calculated, the IQ time difference calculation circuit 234 calculates the IQ time difference T before IQ switching according to Expression (6) (Step S8).

Figure 7:
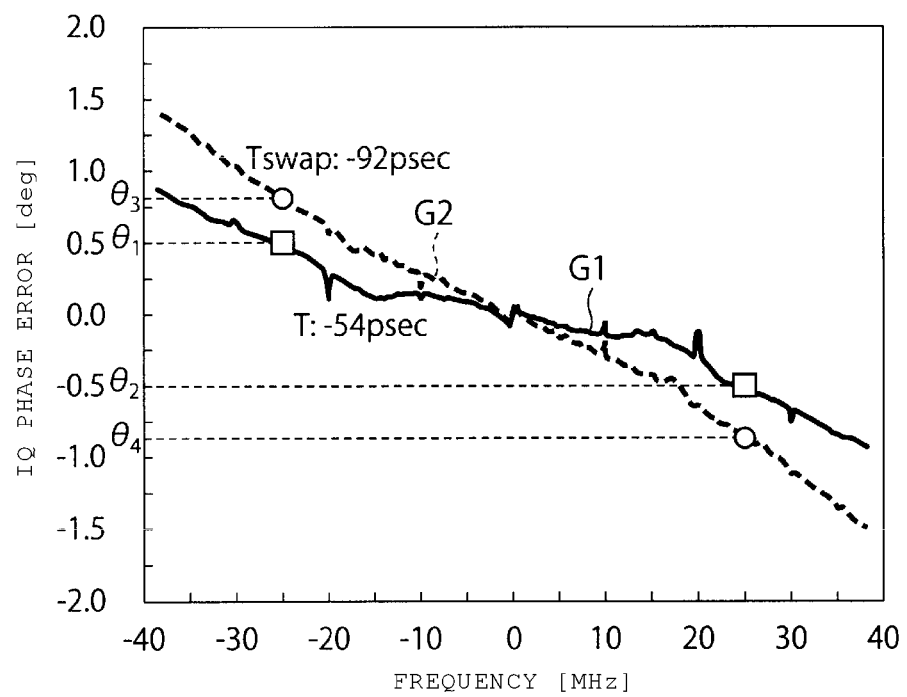
FIG. 7 is an explanatory diagram illustrating calculation of the IQ time difference before IQ switching and the IQ time difference after IQ switching in the operation example of the transceiver according to the third embodiment.

FIG. 7 is an explanatory diagram illustrating calculation of the IQ time difference before IQ switching and the IQ time difference after IQ switching in the operation example of the transceiver 1 according to the third embodiment. The horizontal axis and the vertical axis of the graph in FIG. 7 are the same as that in FIG. 2. In FIG. 7, a corresponding relationship between the IQ phase error and the signal frequency to be obtained by the signal path in FIG. 6 before IQ switching is indicated as line G1 in the graph of FIG. 7. The first phase error $\theta_1$ corresponding to −25 MHz that is an example of the first frequency $f_1$ and the second phase error $\theta_2$ corresponding to +25 MHz that is an example of the second frequency $f_2$ are plotted on the line G1. The IQ time difference T based on the slope of the line G1 is −54 psec, using the calculation of Equation (6).

Here, the IQ time difference T before IQ switching can be represented by the following expression using the delay time $t_1$ to $t_4$ in FIG. 6.

$$T=t_4+t_2-(t_3+t_1) \quad (7)$$

After the IQ time difference T before IQ switching is calculated in the above-described manner, by connecting to the second Q signal path 422, the first IQ signal switching switch 81 connects the first transmission baseband circuit 313 and the second reception baseband circuit 238. In addition, by connecting to the second I signal path 412, the second IQ signal switching switch 82 connects the second transmission baseband circuit 314 and the first reception baseband circuit 237 (Step S9).

Next, the IQ signal generation circuit 311 generates the third I signal and the third Q signal, and the IQ signal switching circuit 315 outputs the third I signal to the second transmission baseband circuit 314 and outputs the third Q signal to the first transmission baseband circuit 313 by the second operation (Step S10). At this time, the third frequency $f_3$ may be −25 MHz which is the same as that of the first frequency $f_1$.

Figure 8:
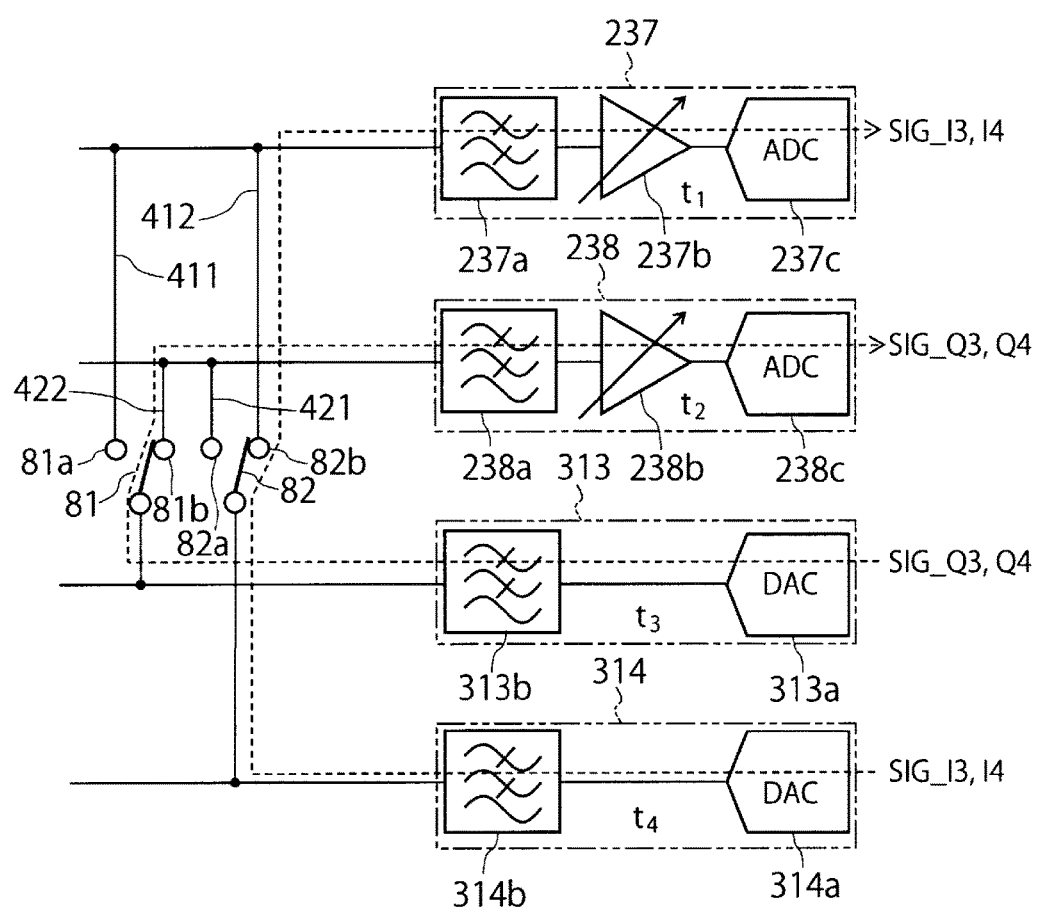
FIG. 8 is an explanatory diagram illustrating calculation of the IQ time difference after IQ switching in the operation example of the transceiver according to the third embodiment.

FIG. 8 is an explanatory diagram illustrating calculation of the IQ time difference $T_{swap}$ after IQ switching in the operation example of the transceiver according to the third embodiment. As indicated in FIG. 8, after digital to analog conversion by the second digital-analog converter 314a and filtering by the second transmission low-pass filter 314b are performed, a third I signal SIG_I3 output to the second transmission baseband circuit 314 is looped back to the first reception baseband circuit 237 through the second I signal path 412. At this time, the delay time $t_4$ due to the second transmission baseband circuit 314 is generated in the third I signal SIG_I3.

In addition, after the digital to analog conversion by the first digital-analog converter 313a and filtering by the first transmission low-pass filter 313b are performed, a third Q signal SIG_Q3 output to the first transmission baseband circuit 313 is looped back to the second reception baseband circuit 238 through the second Q signal path 422. At this time, the delay time $t_3$ due to the first transmission baseband circuit 313 is generated in the third Q signal SIG_Q3.

Next, after filtering by the first reception low-pass filter 237a, amplifying by the first variable gain amplifier 237b, analog to digital conversion by the first analog-digital converter 237c are performed, the third I signal SIG_I3 looped back to the first reception baseband circuit 237 is input to the IQ signal detection circuit 232. At this time, the delay time $t_1$ due to the first reception baseband circuit 237 is generated in the third I signal SIG_I3. In addition, at this time, since the delay time $t_4$ due to the second transmission baseband circuit 314 has been already generated in the third I signal SIG_I3, the total delay time of the third I signal SIG_I3 is $t_1+t_4$.

In addition, after filtering by the second reception low-pass filter 238a, amplifying by second variable gain amplifier 238b, analog to digital conversion by second analog-digital converter 238c are performed, the third Q signal SIG_Q3 looped back to the second reception baseband circuit 238 is input to the IQ signal detection circuit 232. At this time, a delay time $t_2$ due to the second reception baseband circuit 238 is generated in the third Q signal SIG_Q3. In addition, at this time, since the delay time $t_3$ due to the first transmission baseband circuit 313 has been already generated in the third Q signal SIG_Q3, the total delay time of the third Q signal SIG_Q3 is $t_2+t_3$.

As illustrated in FIG. 5, the IQ signal detection circuit 232 detects the input third I signal SIG_I3 and third Q signal SIG_Q3 (Step S11). For example, the IQ signal detection circuit 232 detects the electric power $<I>^2$ of the third I signal SIG_I3, the electric power $<Q>^2$ of the third Q signal SIG_Q3, and the IQ correlation value $<IQ>$ between the third I signal SIG_I3 and the third Q signal SIG_Q3.

After the third I signal SIG_I3 and the third Q signal SIG_Q3 are detected, the IQ error calculation circuit 233 calculates the third phase error $\theta_3$ according to Expression (5) (Step S12).

Next, the IQ signal generation circuit 311 generates the fourth I signal and the fourth Q signal, and the IQ signal switching circuit 315 outputs the fourth I signal to the second transmission baseband circuit 314 and outputs the fourth Q signal to the first transmission baseband circuit 313 by the second operation (Step S13). At this time, the fourth frequency $f_4$ may be +25 MHz which is the same as that of the second frequency $f_2$.

As indicated in FIG. 8, after digital-to-analog conversion by the second digital-analog converter 314a and filtering by the second transmission low-pass filter 314b are performed, a fourth I signal SIG_I4 output to the second transmission baseband circuit 314 is looped back to the first reception baseband circuit 237 through the second I signal path 412. At this time, the delay time $t_4$ due to the second transmission baseband circuit 314 is generated in fourth I signal SIG_I4.

In addition, after the digital to analog conversion by the first digital-analog converter 313a and filtering by the first transmission low-pass filter 313b are performed, a fourth Q signal SIG_Q4 output to the first transmission baseband circuit 313 is looped back to the second reception baseband circuit 238 through the second Q signal path 422. At this time, the delay time $t_3$ due to the first transmission baseband circuit 313 is generated in the fourth Q signal SIG_Q4.

Next, after filtering by the first reception low-pass filter 237a, amplifying by the first variable gain amplifier 237b, and analog to digital conversion by the first analog-digital converter 237c are performed, the fourth I signal SIG_I4 looped back to the first reception baseband circuit 237 is input to the IQ signal detection circuit 232. At this time, the delay time $t_1$ due to the first reception baseband circuit 237 is generated in the fourth I signal SIG_I4. In addition, at this time, since the delay time $t_4$ due to the second transmission baseband circuit 314 has been already generated in the fourth I signal SIG_I4, the total delay time of the fourth I signal SIG_I4 is $t_1+t_4$.

In addition, after filtering by the second reception low-pass filter 238a, amplifying by second variable gain amplifier 238b, and analog to digital conversion by second analog-digital converter 238c are performed, the fourth Q signal SIG_Q4 looped back to the second reception baseband circuit 238 is input to the IQ signal detection circuit 232. At this time, the delay time $t_2$ due to the second reception baseband circuit 238 is generated in the fourth Q signal SIG_Q4. In addition, at this time, since the delay time $t_3$ due to the first transmission baseband circuit 313 has been already generated in the fourth Q signal SIG_Q4, the total delay time of the fourth Q signal SIG_Q4 is $t_2+t_3$.

As illustrated in FIG. 5, the IQ signal detection circuit 232 detects the input fourth I signal SIG_I4 and fourth Q signal SIG_Q4 (Step S14). For example, the IQ signal detection circuit 232 detects the electric power $<I>^2$ of the fourth I signal SIG_I4, the electric power $<Q>^2$ of fourth Q signal SIG_Q4, and the IQ correlation value $<IQ>$ between the fourth I signal SIG_I4 and the fourth Q signal SIG_Q4.

After the fourth I signal SIG_I4 and the fourth Q signal SIG_Q4 are detected, the IQ error calculation circuit 233 calculates the fourth phase error $\theta_4$ according to Expression (5) (Step S15).

After the third phase error $\theta_3$ and the fourth phase error $\theta_4$ are calculated, the IQ time difference calculation circuit 234 calculates the IQ time difference $T_{swap}$ after IQ switching according to Expression (6) (Step S16).

In FIG. 7, a corresponding relationship between the IQ phase error and the signal frequency to be obtained by the signal path in FIG. 8 after IQ switching is indicated on a line G2 of the graph of FIG. 7. The third phase error $\theta_3$ corresponding to −25 MHz that is an example of the third frequency $f_3$ and the fourth phase error $\theta_4$ corresponding to +25 MHz that is an example of the fourth frequency $f_4$ are plotted on the graph on line G2. The IQ time difference $T_{swap}$ based on the slope of the line G2 is −92 psec, which results from the calculation of equation (6).

Here, the IQ time difference $T_{swap}$ after IQ switching can be represented by the following expression using the delay time $t_1$ to $t_4$ in FIG. 8.

$$T_{swap}=t_3+t_2-(t_4+t_1) \quad (8)$$

After the IQ time difference T before IQ switching and IQ time difference $T_{swap}$ after IQ switching are calculated in the above-described manner, the transmission and reception time difference calculation circuit 239 calculates the IQ time difference $D_{RX}$ of the reception circuit 23 and the IQ time difference $D_{TX}$ of the transmission circuit 31 based on the IQ time difference T before IQ switching and the IQ time difference $T_{swap}$ after the IQ switching (Step S17).

Here, according to FIGS. 6 and 8, the IQ time difference $D_{TX}$ of the transmission circuit 31 can be expressed by $t_4-t_3$.

In addition, according to FIGS. 6 and 8, the IQ time difference $D_{RX}$ of the reception circuit 23 can be expressed by $t_2-t_1$.

The transmission and reception time difference calculation circuit 239 can calculate the IQ time difference $D_{RX}$ of the reception circuit 23 and the IQ time difference $D_{TX}$ of the transmission circuit 31 according to following expressions which can be derived from Expressions (7) and (8).

$$D_{RX}=T_2-T_1=(T+T_{SWAP}/2) \quad (9)$$

$$D_{TX}=T_4-T_3=(T-T_{SWAP}/2) \quad (10)$$

After the IQ time difference $D_{RX}$ of the reception circuit 23 is calculated, the IQ time difference correction circuit 235 corrects the calculated IQ time difference $D_{RX}$ of the reception circuit 23 (Step S18).

Figure 9:
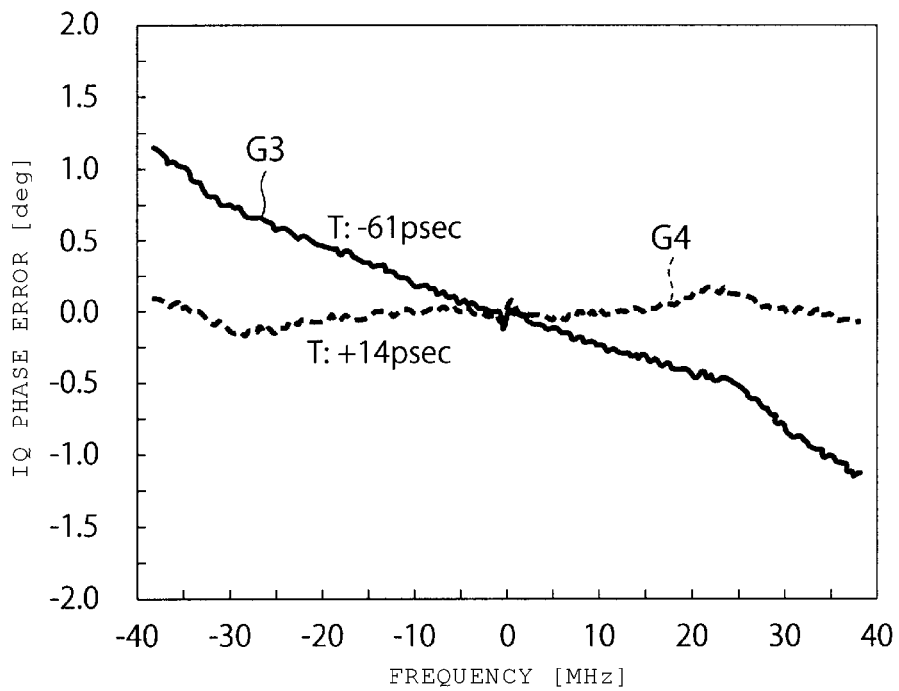
FIG. 9 is a first explanatory diagram illustrating a reception performance after correcting the IQ time difference at a reception circuit in the operation example of the transceiver according to the third embodiment.

FIG. 9 is a first graph illustrating reception performance after correcting the IQ time difference of the reception circuit 23 in the operation example of the transceiver 1 according to the third embodiment. In FIG. 9, the line G3 illustrates the relationship between the IQ phase error (vertical axis) and the signal frequency (horizontal axis) before the IQ time difference correction, and a line G4 illustrates a relationship between the IQ phase error and the signal frequency after the IQ time difference correction are illustrated. In an example in FIG. 9, an IQ signal time difference which is −61 psec before the correction can be reduced to +14 psec after the correction.

Figure 10:
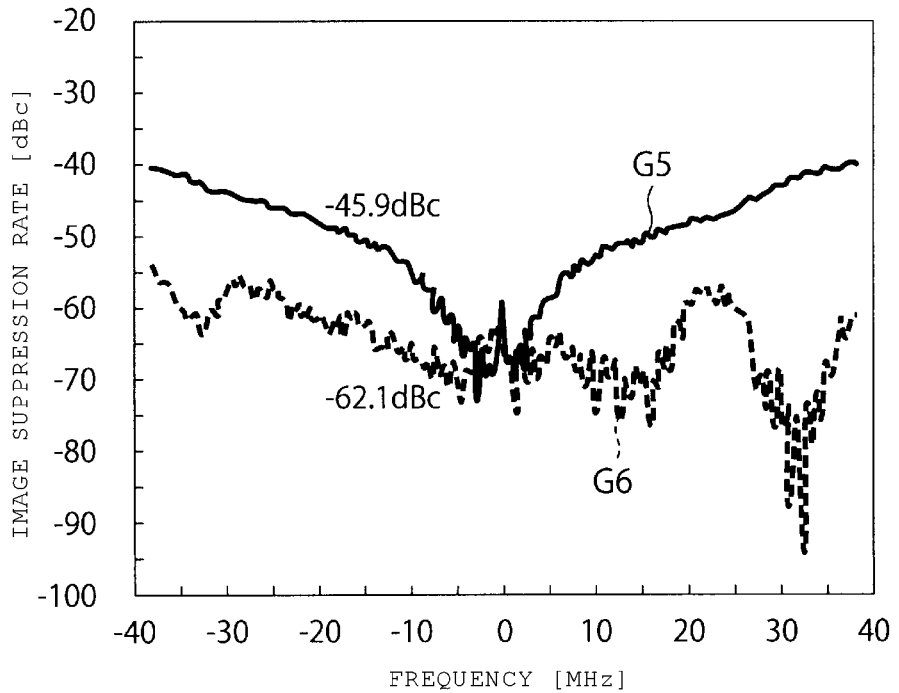
FIG. 10 is a second explanatory diagram illustrating a reception performance after correcting the IQ time difference of the reception circuit in the operation example of the transceiver according to the third embodiment.

FIG. 10 is a second graph illustrating the reception performance after correcting the IQ signal time difference of the reception circuit 23 in the operation example of the transceiver 1 according to the third embodiment. In FIG. 10, a line G5 illustrates the relationship between an image suppression rate (vertical axis) and the signal frequency (horizontal axis) before the IQ time difference correction, and a line G6 illustrates the relationship between the image suppression rate and the signal frequency after the IQ time difference correction. In the example in FIG. 10, an image suppression rate of −45.9 dBc before the IQ time difference correction can be improved to −62.1 dBc after the IQ time difference correction.

According to the third embodiment, the IQ time difference $D_{RX}$ of the reception circuit 23 can be calculated and corrected independently of the IQ time difference $D_{TX}$ of the transmission circuit 31. Accordingly, since the IQ time difference $D_{RX}$ which more accurately simulates the IQ time difference which is generated during the actual reception operation can be calculated and corrected, it is possible to further improve the reception accuracy, as compared with the first embodiment.

Fourth Embodiment

Figure 11:
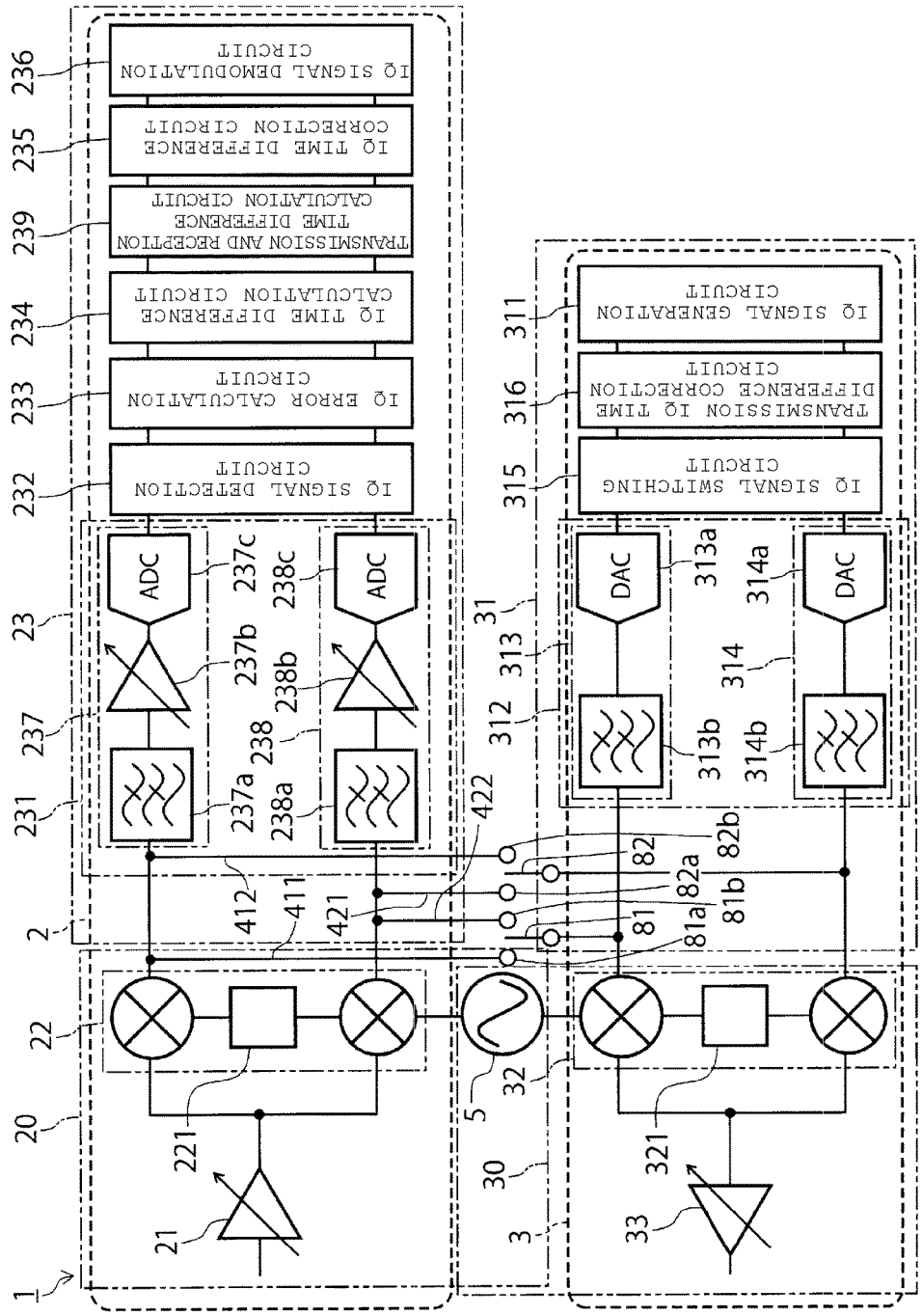
FIG. 11 is a block diagram illustrating a transceiver according to a fourth embodiment.

Next, a fourth embodiment for correcting the IQ time difference of the transmission circuit 31. FIG. 11 is a block diagram illustrating the transceiver 1 according to the fourth embodiment. As illustrated in FIG. 4, the transceiver 1 according to the fourth embodiment further includes a transmission IQ time difference correction circuit 316 in the transmission circuit 31 in addition to the configuration of the transceiver 1 according to the third embodiment.

The transmission IQ time difference correction circuit 316 corrects the IQ time difference $D_{TX}$ of the transmission circuit 31 calculated by the transmission and reception time difference calculation circuit 239.

According to the fourth embodiment, the IQ time difference $D_{TX}$ of the transmission circuit 31 can be independently calculated and corrected from the IQ time difference $D_{RX}$ of the reception circuit 23. Accordingly, the transmission operation to the partner communication apparatus can be appropriately performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmission and reception circuit comprising:
a transmission circuit including an output section, a signal generating circuit generating an in-phase component signal and an orthogonal component signal, and a transmission analog baseband circuit configured to perform digital to analog conversion of the generated in-phase component signal and orthogonal component signal;
a reception circuit including an input section, a reception analog baseband circuit performing analog to digital conversion of the transmitted in-phase component signal and orthogonal component signal, and a signal detection circuit that detects the analog-to-digital converted in-phase component signal and orthogonal component signal converted by the reception analog baseband circuit; and
a feedback path, a first end of which is connected to the output section of the transmission circuit, and a second end of which is connected to the input section of the reception circuit, wherein
the transmission analog baseband circuit comprises a first transmission baseband circuit through which a first in-phase component signal and a first orthogonal component signal pass, and a second transmission baseband circuit through which a second in-phase component signal and a second orthogonal component signal pass,
the reception analog baseband circuit comprises a first reception baseband circuit through which in-phase component signals pass and a second reception baseband circuit through which orthogonal component signals pass, and
the feedback path further comprises an in-phase component path connected to the first transmission baseband circuit and through which the in-phase component signals pass to the first reception baseband circuit, and an orthogonal component path connected to the second transmission baseband circuit and through which the orthogonal component signals pass to the second reception baseband circuit.

2. The circuit according to claim 1, further comprising:
a switch selectably connecting the output section of the transmission circuit to the feedback path.

3. The circuit according to claim 1, wherein:
the reception circuit includes a time difference detection circuit detecting a time difference between the in-phase component signal and the orthogonal component signal detected by the signal detection circuit;
the signal generation circuit generates a plurality of sinusoidal in-phase component signals and orthogonal component signals having different frequencies; and
the time difference detection circuit detects the time difference between the in-phase component signal and the orthogonal component signal based on the plurality of in-phase component signals and orthogonal component signals which are detected by the signal detection circuit passing through the transmission analog baseband circuit, the feedback path, and the reception analog baseband circuit.

4. The circuit according to claim 1, wherein:
the transmission circuit includes a signal output circuit that sequentially executes a first operation that outputs an in-phase component signal to the first transmission baseband circuit and outputs an orthogonal component signal to the second transmission baseband circuit, and a second operation that outputs the in-phase component signal to the second transmission baseband circuit and the orthogonal component signal to the first transmission baseband circuit;
the in-phase component path includes a first in-phase component path that connects the first transmission baseband circuit to the first reception baseband circuit when executing the first operation, and a second in-phase component path that connects the second transmission baseband circuit to the first reception baseband circuit when executing the second operation; and
the orthogonal component path includes a first orthogonal component path that connects the second transmission baseband circuit to the second reception baseband circuit when executing the first operation, and a second orthogonal component path that connects the first transmission baseband circuit to the second reception baseband circuit when executing the second operation.

5. The circuit according to claim 4, further comprising:
a first switch that connects to the first in-phase component path when the first operation is executed and connects to the second orthogonal component path when the second operation is executed; and
a second switch that connects to the first orthogonal component path when the first operation is executed and connect to the second in-phase component path when the second operation is executed.

6. The circuit according to claim 5, wherein:
the reception circuit includes the time difference detection circuit that detects the time difference between the in-phase component signal and the orthogonal component signal detected by the signal detection circuit;
when executing the first operation, the signal generation circuit sequentially executes generation of the first in-phase component signal and the first orthogonal component signal having a first frequency, and generation of the second in-phase component signal and the second orthogonal component signal having a second frequency;
when executing the first operation, the signal detection circuit sequentially executes detection of the first in-phase component signal and the first orthogonal component signal and detection of the second in-phase component signal and the second orthogonal component signal; and
a time difference detection circuit detects the time difference in-phase component signal and the orthogonal component signal based on a first phase error between the detected first in-phase component signal and first orthogonal component signal and a second phase error between detected second in-phase component signal and second orthogonal component signal.

7. The circuit according to claim 6, wherein:
when executing the second operation, the signal generation circuit sequentially executes generation of a third in-phase component signal and a third orthogonal component signal having a third frequency, and generation of a fourth in-phase component signal and a fourth orthogonal component signal having a fourth frequency;

when executing the second operation, the signal detection circuit sequentially executes detection of the third in-phase component signal and the third orthogonal component signal and detection of the fourth in-phase component signal and the fourth orthogonal component signal; and the time difference detection circuit detects the time difference based on the first phase error, the second phase error, a third phase error between the detected third in-phase component signal and third orthogonal component signal and a fourth phase error between the detected fourth in-phase component signal and fourth orthogonal component signal.

8. The circuit according to claim 7, wherein the time difference detection circuit independently detects the time difference of the in-phase component signals and the orthogonal component signal in the reception circuit and the time difference in-phase component signals and fourth orthogonal component signals in the transmission circuit.

9. The circuit according to claim 8, wherein
the reception circuit includes a first correction circuit that corrects the time difference in the reception circuit, and
the transmission circuit includes a second correction circuit that corrects the time difference in the transmission circuit.

10. A transceiver communicable with a communication partner, comprising a transmission and reception circuit which includes:
a transmission circuit comprising a signal generating circuit generating an in-phase component signal and an orthogonal component signal, and a transmission analog baseband circuit configured to perform digital to analog conversion of the generated in-phase component signal and orthogonal component signal;
a reception circuit comprising a reception analog baseband circuit configured to perform analog to digital conversion of the transmitted in-phase component signal and orthogonal component signal, a signal detection circuit configured to detect the analog to digital converted in-phase component signal and orthogonal component signal, a time difference detection circuit configured to detect the time difference between the detected in-phase component signal and orthogonal component signal, and a first correction circuit that corrects the detected time difference; and
a feedback path, a first end of which is connected to the transmission analog baseband circuit and a second end of which is connected to the reception analog baseband circuit, wherein
the transmission analog baseband circuit comprises a first transmission baseband circuit through which a first in-phase component signal and a first orthogonal component signal pass, and a second transmission baseband circuit through which a second in-phase component signal and a second orthogonal component signal pass,
the reception analog baseband circuit comprises a first reception baseband circuit through which the in-phase component signals pass and a second reception baseband circuit through which the orthogonal component signals pass, and
the feedback path includes an in-phase component path connected to one circuit of the first and second transmission baseband circuits and through which the in-phase component signal passes to the first reception baseband circuit, and an orthogonal component path connected to the other circuit of the first and second transmission baseband circuits and through which the orthogonal component signal passes to the second reception baseband circuit.

11. The transceiver according to claim 10, further comprising a switch selectably connecting the transmission circuit to the feedback path.

12. The transceiver according to claim 10, wherein
the signal generation circuit is configured to generate a plurality of sinusoidal in-phase component signals and orthogonal component signals having different frequencies, and
the time difference detection circuit detects the time difference based on the plurality of in-phase component signals and orthogonal component signals which are detected by the signal detection circuit passing through the transmission analog baseband circuit, the feedback path, and the reception analog baseband circuit.

13. The transceiver according to claim 10, wherein
the transmission circuit includes a signal output circuit that sequentially executes a first operation that outputs the in-phase component signal to the first transmission baseband circuit and outputs the orthogonal component signal to the second transmission baseband circuit, and a second operation that outputs the in-phase component signal to the second transmission baseband circuit and outputs the orthogonal component signal to the first transmission baseband circuit;
the in-phase component path includes a first in-phase component path that connects the first transmission baseband circuit to the first reception baseband circuit when executing the first operation and a second in-phase component path that connects the second transmission baseband circuit to the first reception baseband circuit when executing the second operation; and
the orthogonal component path includes a first orthogonal component path that connects the second transmission baseband circuit to the second reception baseband circuit when executing the first operation, and a second orthogonal component path that connects the first transmission baseband circuit to the second reception baseband circuit when executing the second operation.

14. The transceiver according to claim 13, further comprising:
a first switch that connects to the first in-phase component path when executing the first operation and connects to the second orthogonal component path when executing the second operation; and
a second switch that connects to the first orthogonal component path when executing the first operation and connect to the second in-phase component path when executing the second operation.

15. A method of correcting a time difference between two different components of a signal within a transceiver including a transmission circuit including an output section, a signal generating circuit, and a transmission analog baseband circuit, a reception circuit including an input section, a reception analog baseband circuit, and a signal detection circuit, and a feedback path, a first end of which is connected to the output section of the transmission circuit, and a second end of which is connected to the input section of the reception circuit, comprising:

generating, as the signal, an in-phase component signal and an orthogonal component signal using the signal generating circuit;

digital to analog converting the generated in-phase component signal and the orthogonal component signal using the transmission analog baseband circuit;

sending the generated in-phase component signal and the orthogonal component signal on the feedback path within the transceiver;

analog to digital converting the in-phase component signal and the orthogonal component signal using the reception analog baseband circuit;

detecting the analog to digital converted in-phase component signal and orthogonal component signal using the signal detection circuit;

detecting a time difference between the detected analog to digital converted in-phase component signal and the analog to digital converted orthogonal component signal based on a common property thereof; and correcting time difference of generated in-phase component signals and orthogonal component signals using the detected time difference, wherein the transmission analog baseband circuit comprises a first transmission baseband circuit through which a first in-phase component signal and a first orthogonal component signal pass, and a second transmission baseband circuit through which a second in-phase component signal and a second orthogonal component signal pass, the reception analog baseband circuit comprises a first reception baseband circuit through which in-phase component signals pass and a second reception baseband circuit through which orthogonal component signals pass, and the feedback path further comprises an in-phase component path connected to the first transmission baseband circuit and through which the in-phase component signals pass to the first reception baseband circuit, and an orthogonal component path connected to the second transmission baseband circuit and through which the orthogonal component signals pass to the second reception baseband circuit.

16. The method of claim 15, further comprising:

generating the in-phase component signal and an orthogonal component signal and digital to analog converting the generated in-phase component signal and the orthogonal component signal in the generating circuit;

correcting the time difference between the in-phase component signal and an orthogonal component signal; and transmitting the time corrected in-phase component signal and an orthogonal component signal using a transmission circuit.

17. The method of claim 16, wherein correcting the time difference between the in-phase component signal and an orthogonal component signal includes calculating an error based on the power of the in-phase component signal and the power of the orthogonal component signal.

18. The method of claim 16, wherein the transmission circuit is connected to a reception circuit, and the detecting of the time difference between the orthogonal signal component and in-phase signal component occurs in the reception circuit.

* * * * *